US012151917B2

(12) United States Patent
Freitas et al.

(10) Patent No.: US 12,151,917 B2
(45) Date of Patent: Nov. 26, 2024

(54) CONTAINER HANDLING VEHICLE HAVING AN ARTICULABLE LIFTING UNIT

(71) Applicant: INDEPENDENT ROUGH TERRAIN CENTER LLC, Cibolo, TX (US)

(72) Inventors: Joe Freitas, Cibolo, TX (US); Brian Harrington, Cibolo, TX (US)

(73) Assignee: INDEPENDENT ROUGH TERRAIN CENTER LLC, Cibolo, TX (US)

( * ) Notice: Subject to any disclaimer, the term of this patent is extended or adjusted under 35 U.S.C. 154(b) by 889 days.

(21) Appl. No.: 17/287,926

(22) PCT Filed: Oct. 24, 2018

(86) PCT No.: PCT/US2018/057372

§ 371 (c)(1),
(2) Date: Apr. 22, 2021

(87) PCT Pub. No.: WO2020/086077

PCT Pub. Date: Apr. 30, 2020

(65) Prior Publication Data

US 2021/0403292 A1 Dec. 30, 2021

Related U.S. Application Data

(60) Provisional application No. 62/749,594, filed on Oct. 23, 2018.

(51) Int. Cl.
*B66C 1/10* (2006.01)
*B66C 23/42* (2006.01)
*B66F 9/065* (2006.01)

(52) U.S. Cl.
CPC ................ *B66C 1/10* (2013.01); *B66C 23/42* (2013.01); *B66F 9/065* (2013.01)

(58) Field of Classification Search
CPC . B66C 1/10; B66C 1/101; B66C 23/42; B66F 9/065

(Continued)

(56) References Cited

U.S. PATENT DOCUMENTS 4,016,992 A * 4/1977 Larsen .................... B66C 13/08 212/259
4,350,254 A * 9/1982 Noly ....................... B66C 1/101 294/81.4

(Continued)

FOREIGN PATENT DOCUMENTS

JP 2009274779 A 11/2009
WO 2017157481 A1 9/2017
WO 2020086077 A1 4/2020

OTHER PUBLICATIONS

International Search Report and Written Opinion dated Jan. 17, 2019, for International Application No. PCT/US2018/057372, filed on Oct. 24, 2018.

(Continued)

*Primary Examiner* — Paul T Chin
(74) *Attorney, Agent, or Firm* — Conley Rose, P.C.

(57) ABSTRACT

A lifting unit for a vehicle can include a mounting assembly configured to pivotally couple to a lifting boom of the vehicle, a coupler assembly configured to releasably couple with equipment positionable by the lifting unit, and a rotary actuator assembly coupled between the mounting assembly and the coupler assembly. The mounting assembly includes a mount, a travelling frame coupled to the mount, and an extension actuator configured to displace the travelling frame along an extension axis relative to the mount. The rotary actuator assembly is configured to rotate the coupler assembly about a rotational axis.

19 Claims, 13 Drawing Sheets

(58) Field of Classification Search
USPC .......................................................... 294/81.53
See application file for complete search history.

(56) References Cited

U.S. PATENT DOCUMENTS

| | | | | |
|---|---|---|---|---|
| 4,352,516 | A * | 10/1982 | Gasper | B66C 1/10 294/81.1 |
| 4,402,543 | A * | 9/1983 | Simpson | B66F 9/186 294/81.53 |
| 6,024,232 | A | 2/2000 | Helgesson | |
| 7,766,596 | B2 | 8/2010 | Smith et al. | |
| 2007/0173999 | A1* | 7/2007 | Shinozaki | E02F 9/2079 701/50 |
| 2007/0201972 | A1* | 8/2007 | Tsuji | B60K 17/16 414/718 |
| 2008/0131248 | A1* | 6/2008 | Friz | B66C 13/04 414/561 |
| 2010/0288718 | A1 | 11/2010 | Helgesson | |
| 2023/0116088 | A1* | 4/2023 | Josin | B66C 1/101 414/815 |

OTHER PUBLICATIONS

YouTube Video: "Kalmar reachstacker with a tilting spreader" (Kalmar Global) Nov. 19, 2017 (Nov. 19, 2017) entire video. URL https://www.youtube.com/watchv=SILICARM7LM.

International Preliminary Report on Patentability dated May 6, 2021, for International Application No. PCT/US2018/057372, filed on Oct. 24, 2018.

* cited by examiner

CONTAINER HANDLING VEHICLE HAVING AN ARTICULABLE LIFTING UNIT

CROSS-REFERENCE TO RELATED APPLICATIONS

This application is a filing under 35 U.S.C. 371 as the National Stage of International Application No. PCT/US2018/057372, filed on Oct. 24, 2018 and entitled, "CONTAINER HANDLING VEHICLE HAVING AN ARTICULABLE LIFTING UNIT," which claims the benefit of and claims priority to U.S. Provisional Application Ser. No. 62/749,594, filed Oct. 23, 2018 and entitled "CONTAINER HANDLING VEHICLE HAVING AN ARTICULABLE LIFTING UNIT", both of which are herein incorporated by reference as if reproduced in their entirety for all purposes.

STATEMENT REGARDING FEDERALLY SPONSORED RESEARCH OR DEVELOPMENT

Not applicable.

BACKGROUND

Container handling vehicles may be used to manipulate and handle containers such as intermodal cargo containers. Container handling vehicles configured for handling cargo containers include forklift trucks, masted container handlers, and reach stackers sometimes also referred to as "boom trucks." In some applications, reach stackers include an articulable and telescopic boom positioned above or beside a cab that receives an operator or driver of the reach stacker. The cab of the reach stacker may be centrally located or offset relative to a chassis of the reach stacker. Reach stackers typically include a lifting unit coupled to a terminal end of the telescopic boom and configured to releasably couple to a container, such as an intermodal cargo container. For instance, the lifting unit may include an expandable attachment or "spreader" that releasably locks to the container, permitting the reach stacker to transport the container between transportation vehicles such as railroad flat cars or transport ships, for instance. In some applications, the lifting unit of the reach stacker includes one or more actuators to allow the operator of the reach stacker to precisely position the container coupled to the lifting unit.

SUMMARY

In an embodiment, a lifting unit for a vehicle comprises a mounting assembly configured to pivotally couple to a lifting boom of the vehicle, a coupler assembly configured to releasably couple with equipment positionable by the lifting unit, and a rotary actuator assembly coupled between the mounting assembly and the coupler assembly. The mounting assembly includes a mount, a travelling frame coupled to the mount, and an extension actuator configured to displace the travelling frame along an extension axis relative to the mount. The rotary actuator assembly is configured to rotate the coupler assembly about a rotational axis.

In an embodiment, a lifting unit for a vehicle comprises: a mounting assembly configured to pivotally couple to a lifting boom of the vehicle, a coupler assembly configured to releasably couple with equipment positionable by the lifting unit; a rotary actuator assembly coupled between the mounting assembly and the coupler assembly; and a tilting actuator coupled between the mounting assembly and the rotary actuator assembly. The mounting assembly comprises a mount. The rotary actuator assembly is configured to rotate the coupler assembly about a rotational axis, and the tilting actuator is configured to rotate the coupler assembly about a tilt axis.

In an embodiment, a vehicle for handling equipment comprises a chassis comprising a rotatable axle, a lifting boom pivotally coupled to the chassis, and a lifting unit coupled to an end of the lifting boom. The lifting unit comprises: a mounting assembly pivotally coupled to the end of the lifting boom of the vehicle, a coupler assembly configured to releasably couple with equipment positionable by the lifting unit, and a rotary actuator assembly coupled between the mounting assembly and the coupler assembly. The rotary actuator assembly is configured to rotate the coupler assembly about a rotational axis.

BRIEF DESCRIPTION OF THE DRAWINGS

For a detailed description of various exemplary embodiments, reference will now be made to the accompanying drawings in which.

DETAILED DESCRIPTION OF THE DISCLOSED EMBODIMENTS

Figure 1:
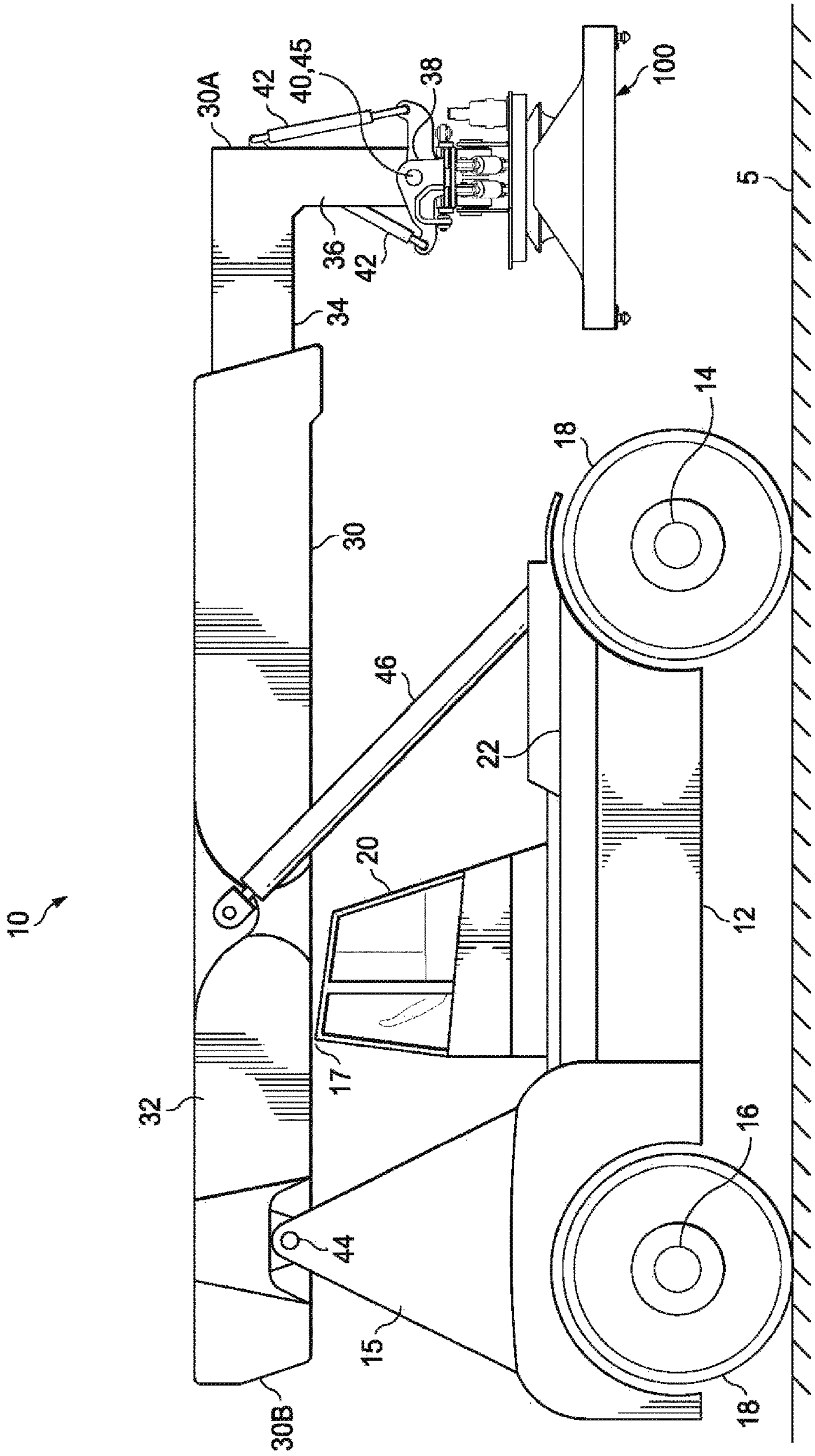
FIG. 1 is a side view of an embodiment of a container handling vehicle in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to. . . . " Also, the term "couple" or "couples" is intended to mean either an indirect or direct connection. Thus, if a first device couples to a second device, that connection may be through a direct connection, or through an indirect connection via other devices, components, and connections.

In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Container handling vehicles have the cab for the operator located on the chassis of the vehicle. The operator can manipulate equipment coupled to the attachment at the end of the boom through a variety of actions including repositioning the entire vehicle, or manipulating the lifting unit in a number of ways. Some lifting units contain a rotary actuator coupled to the boom so that the equipment can be rotated by the operator. Some units can allow for an additional ability to laterally shift the equipment relative to the rotary actuator. Thus, the equipment can be rotated relative to the operator. Once rotated off of a initial position in which the lateral movement of the equipment would be along an axis that is perpendicular to the main axis of the boom and chassis, any lateral movement is not entirely lateral with respect to the operator. When rotated ninety degrees from such a starting position, the lateral movement translates the equipment forward and backwards relative to the operator's position. In this position, the operator is limited to a forward and backwards motion of the equipment such that the only option to move the equipment laterally from the operator's perspective is to move the entire vehicle. This can be difficult when the equipment has limited clearance from surrounding structures or equipment.

Further rotation of the equipment using the rotary actuator past ninety degrees inverts the controls such that a movement to the left (from the operator's perspective) will move the equipment to the right (also from the operator's view). This can result in confusion in the motions for the operator. Further directional controls can further complicate and slow down the operator's ability to control the placement and positioning of the equipment. Thus, the placement of the rotary unit between the lateral and/or tilt controls and the boom can result in a limited ability to move any equipment coupled to a mounting assembly as well as making any movement more difficult in certain positions.

Disclosed herein is a lifting unit that maintains relative directional controls of equipment coupled to the lifting unit from the perspective of the operator. As described below, the lifting unit provides for lateral and/or tilt controls to be placed between the equipment and the boom. A rotary unit used for rotational control can be placed between the equipment and the lateral and/or tilt controls. Since the rotary unit is below the lateral controls, the lateral movement of the equipment can be maintained along a lateral axis relative to the operator. As a result, a left movement control input will always result in the equipment moving to the left, and a right movement control input will always result in the equipment moving to the right. Further, tilt control can also be maintained relative to the position of the operator. In this arrangement, the equipment can be rotated ninety degrees from a starting position and still moved laterally, which is not possible in other configurations. Further, the relative motion remains along fixed axis such that the operator can more accurately and repeatably position equipment with the container handling vehicles. This configuration allows for equipment to be shifted in any direction irrespective of the relative position inputs of the lateral, tilt, or rotational actuators. This type of omni-shift positioning system may have various advantages and benefits as described herein.

Referring to FIG. 1, an embodiment of a vehicle for handling equipment or reach stacker 10 is shown. In the embodiment of FIG. 1, reach stacker 10 generally includes a chassis 12, a first or front axle 14, a second or rear axle 16 opposite front axle 14, a driver's cab 20 that can be positioned on a rail of the chassis 12 that extends longitudinally between the laterally extending axles 14 and 16, a telescopic lifting boom 30 extending above the chassis 12, and a lifting unit 100 pivotally coupled to the lifting boom 30. A pair of wheels 18 are coupled to each axle 14 and 16 such that wheels 18 are positioned along the lateral sides of chassis 12 with lifting boom 30 located centrally between wheels 18. Lifting boom 30 has a first or forward end 30A and a second or rear end 30B opposite forward end 30A. In this embodiment, lifting boom 30 comprises an outer boom 32 extending from rear end 30B and an inner boom or telescopic arm 34 that extends telescopically from outer boom 32 to the forward end 30A of lifting boom 30.

In this embodiment, telescopic arm 34 of lifting boom 30 includes an angled extension 36 located at forward end 30A that extends towards a surface upon which reach stacker 10 is positioned (e.g., the ground below wheels 18). Lifting unit 100 is pivotally coupled to a terminal or free end 38 of the extension 36 of telescopic arm 34. As will be described further herein, lifting unit 100 of reach stacker 10 is configured to releasably couple, manipulate, and position containers, such as intermodal cargo containers, handled by reach stacker 10. In this embodiment, lifting unit 100 is pivotally coupled with the telescopic arm 34 of lifting boom 30 via a laterally extending shaft 40 located at the terminal end 38 of extension 36. A pair of linear actuators (e.g., hydraulic cylinders, etc.) can be coupled between extension 36 of telescopic arm 34 and lifting unit 100. In this arrangement, an operator located in the cab 20 of reach stacker 10 may selectively rotate or tilt lifting unit 100 about a first lateral or pivot axis 45 extending through shaft 40 in both rotational directions (clockwise and counterclockwise). Additionally, lifting unit 100 may be selectively extended or retracted from the chassis 12 of reach stacker 10 by extending or retracting telescopic arm 34 of lifting boom 30 relative outer boom 32 via one or more linear actuators (not shown in FIG. 1). In some embodiments, lifting boom 30 may include a plurality of telescopic arms instead of the single telescopic arm 34 shown in FIG. 1. Although in this embodiment lifting unit 100 comprises a component of the reach stacker 10 shown in FIG. 1, in other embodiments, lifting unit 100 may be used in conjunction with or comprise a component of other container handling vehicles that differ from reach stacker 10.

In this embodiment, reach stacker 10 includes a mounting stand 15 that extends vertically from chassis 12 and pivotally couples with, and physically supports, lifting boom 30. Particularly, mounting stand 15 pivotally couples with outer boom 32 near the rear end 30B of lifting boom 30 via a laterally extending shaft 44. Mounting stand 15 extends vertically a predetermined distance from chassis 12 such that lifting boom 30 is positioned at such a level that a vertical space 17 is provided between the cab 20 and lifting boom 30 when lifting boom 30 is disposed in a lowermost position, as shown in FIG. 1. Reach stacker 10 additionally includes a pair of linear actuators 46 (e.g., hydraulic cylinders, etc.) coupled between outer boom 32 of lifting boom 30 and chassis 12. In this arrangement, an operator located in the cab 20 of reach stacker 10 may selectively rotate or tilt lifting boom 30 about a lateral axis extending through lateral shaft 44 in both rotational directions.

Figure 2:
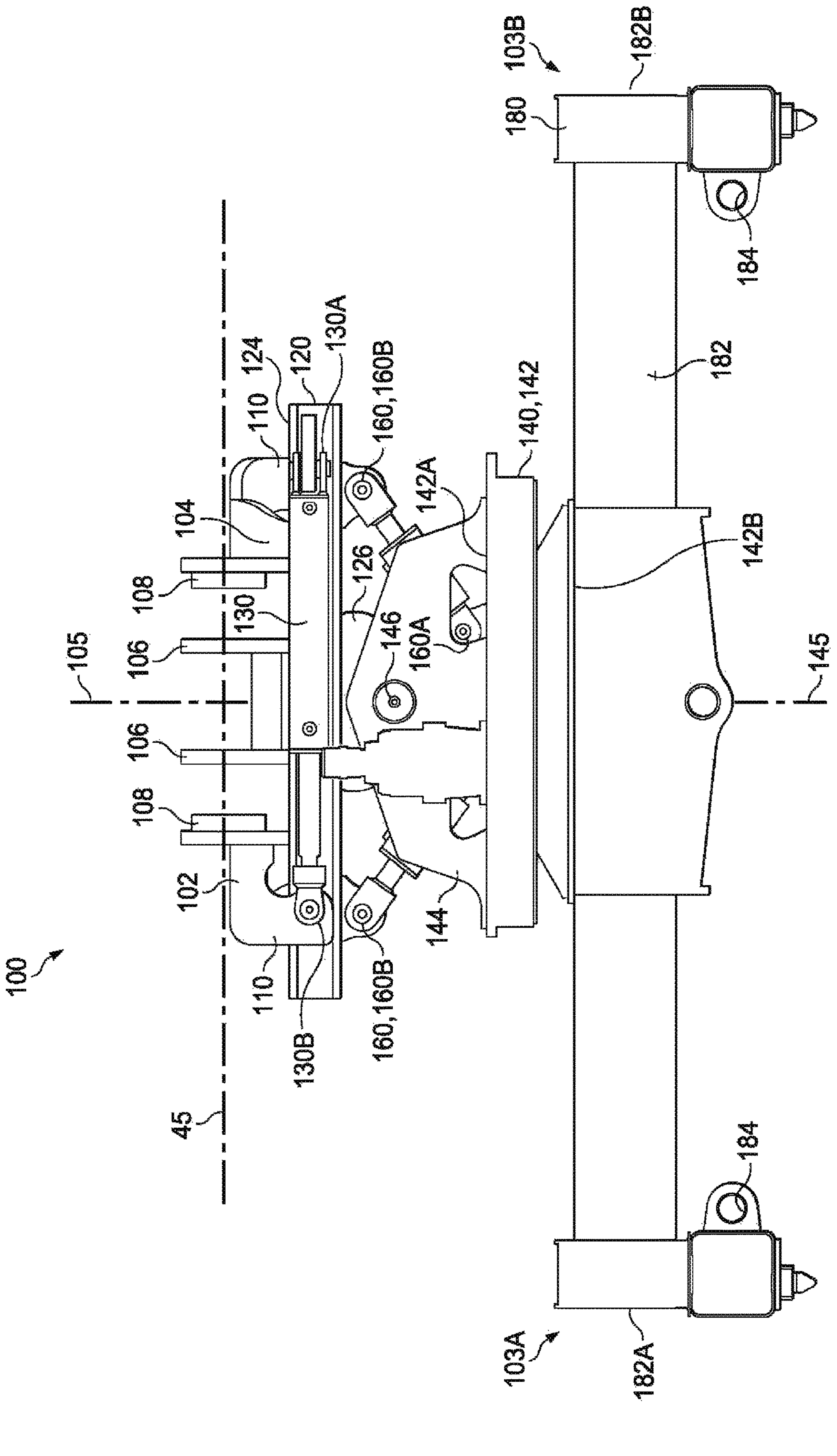
FIG. 2 is a rear view of an embodiment of a lifting unit of the container handling vehicle of FIG. 1 in accordance with principles disclosed herein.
Figure 3:
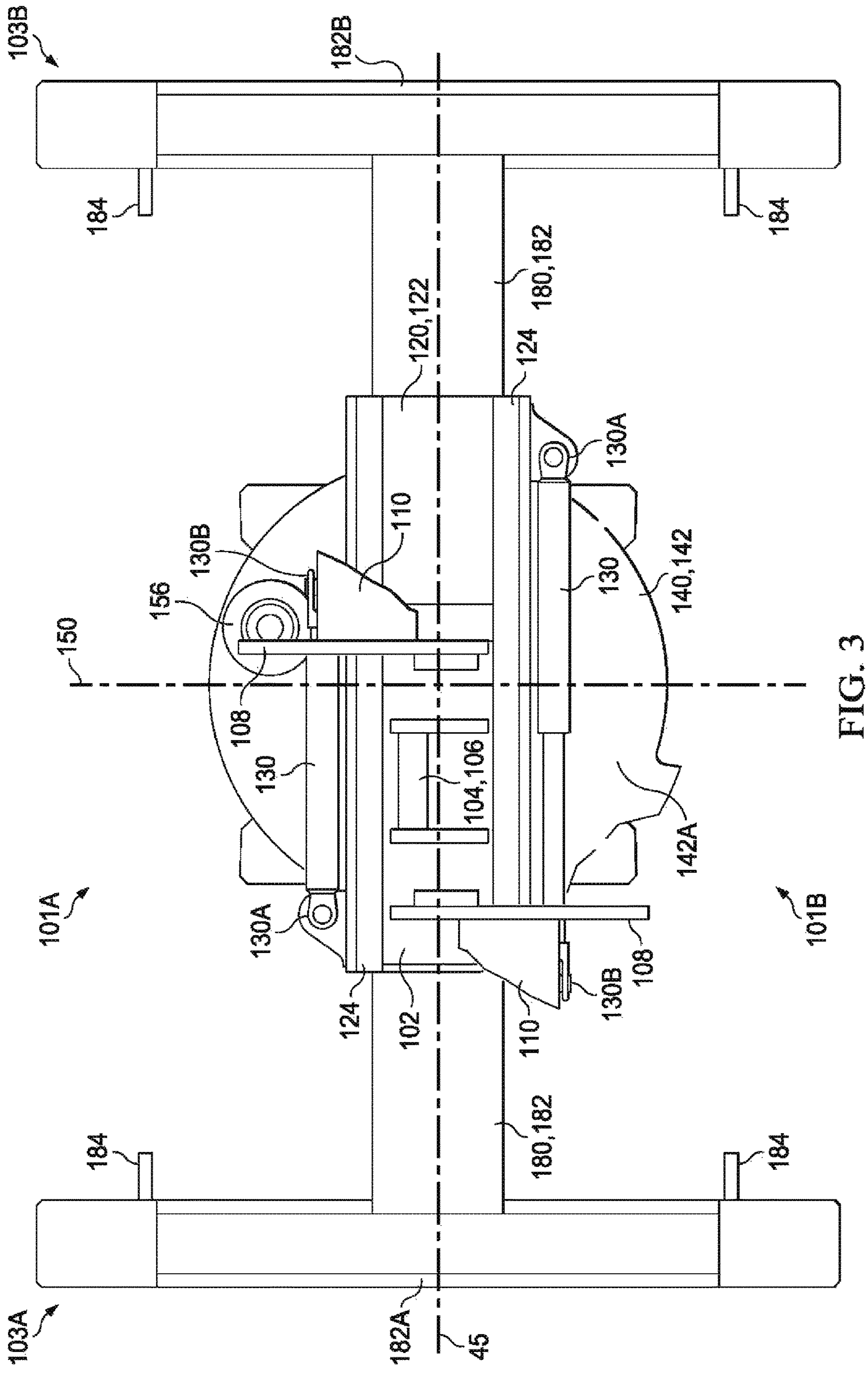
FIG. 3 is a top view of the lifting unit of FIG. 2 in a first laterally extended position.

Referring to FIGS. 1-3, an embodiment of the lifting unit 100 of the reach stacker 10 of FIG. 1 is shown in FIGS. 2, 3. Lifting unit 100 is configured to releasably couple with and manipulate containers, handled by reach stacker 10, and has a first or forward end 101A, a second or rear end 101B, a first lateral side 103A, a second lateral side 103B opposite first lateral side 103A, and a central or longitudinal axis 105. In the embodiment of FIG. 2, lifting unit 100 generally includes a mounting assembly 102, a rotary actuator assembly 140, and a coupler assembly 180. Mounting assembly 102 pivotally couples lifting unit 100 with extension 36 of the telescopic arm 34 of lifting boom 30 via shaft 40. In this embodiment, the mounting assembly 102 of lifting unit 100 has a longitudinal or central axis coaxial with central axis 105 of lifting unit 100 and generally includes an upper mount 104 and a lower travelling frame 120 coupled therewith such that lateral movement between upper mount 104 and travelling frame 120 (as well as rotary actuator assembly 140 and coupler assembly 180) is permitted therebetween.

In this embodiment, upper mount 104 of mounting assembly 102 includes a centrally positioned pivotal connecter 106 a pair of actuator connectors 108, where an actuator connector 108 is positioned at each lateral side of the centrally positioned pivotal connector 106. Pivotal connector 106 includes a pair of apertures aligned with first lateral axis 45 such that shaft 40 may be received therein to pivotally couple the upper mount 104 of mounting assembly 102 with the telescopic arm 34 of lifting boom 30. Each actuator connector 108 of upper mount 104 is offset from the first lateral axis 45 and pivotally couples with an end of one of the linear actuators 42 that extend between the extension 36 of telescopic arm 34 and lifting unit 100. In this configuration, the extension and retraction of linear actuators 42 applies a torque to upper mount 104 that rotates lifting unit 100 about first lateral axis 45. In this embodiment, upper mount 104 includes a pair of U-shaped arms 110 positioned at lateral ends of upper mount 104. Arms 110 couple with and physically support actuator connectors 108 and pivotal connector 106.

In this embodiment, travelling frame 120 of mounting assembly 102 generally includes a support plate 122, a pair of I-beam shaped rails 124 coupled therewith, and a lower mounting plate 126 extending vertically (e.g., along central axis 105) from support plate 122. Particularly, rails 124 each extend laterally along axis parallel with first lateral axis 45 and are positioned at the forward and rearward sides (e.g., the sides positioned at forward and rearward ends 101A, 101B, respectively, of lifting unit 100) of support plate 122. Each rail 124 of travelling frame 120 slidably couples with an arm 110 of upper mount 104 to permit upper mount 104 to physically support travelling frame 120 while also permitting relative lateral movement along an axis parallel with first lateral axis 45 between upper mount 104 and travelling frame 120. In this embodiment, mounting assembly 102 additionally includes a pair of first or upper linear actuators 130 (e.g., hydraulic cylinders, etc.) coupled between upper mount 104 and travelling frame 120.

Particularly, each upper linear actuator 130 extends along an axis parallel with first lateral axis 45 and includes a first or housing end 130A and a second or telescopic end 130B extendable and retractable from housing end 130A. The housing end 130A of each upper linear actuator 130 is mounted to one of the rails 124 of travelling frame 120 while the opposing, telescopic end 130B of each upper linear actuator 130 is coupled to one of the arms 110 of upper mount 104. In response to the extension of the telescopic end 130B of a first of the upper linear actuators 130 and the corresponding retraction of the telescopic end 130B of a second of the upper linear actuators 130, the travelling frame 120 of mounting assembly 102 is moved along an axis parallel with first lateral axis 45 in a first lateral direction with rails 124 of travelling frame 120 sliding along arms 110 of upper mount 104. Conversely, in response to the extension of the telescopic end 130B of the second of the upper linear actuators 130 and the corresponding retraction of the telescopic end 130B of the first of the upper linear actuators 130, the travelling frame 120 of mounting assembly 102 is moved in a second lateral direction opposite the first lateral direction.

The rotary actuator assembly 140 of lifting unit 100 has a central or rotational axis 145 and provides for the selective rotation of coupler assembly 180 about central axis 145 in both rotational directions (clockwise and counterclockwise). As will be described further herein, central axis 145 of rotary actuator assembly 140 may be disposed coaxial with the central axis 105 of lifting unit 100 and mounting assembly 104 or angularly offset from central axis 105. In this embodiment, rotary actuator assembly 140 generally includes an actuator housing 142, a rotary actuator 156, and a pair of second or lower linear actuators 160 (e.g., hydraulic cylinders, etc.). Rotary actuator 156 is disposed at least partially within actuator housing 142 and is rotatably coupled with the coupler assembly 180 of lifting unit 100. The actuator housing 142 of rotary actuator assembly 140 has a first or upper end 142A and a second or lower end 142B opposite upper end 142A. A support frame 144 extends vertically from the upper end 142A of actuator housing 142 and is pivotally coupled to the mounting plate 126 of mounting assembly 120 via a pivotal connector 146 that thereby pivotally couples the rotary actuator assembly 140 with the mounting assembly 120 of lifting unit 100.

Each lower linear actuator 160 of rotary actuator assembly 140 extends at an angle relative to central axis 145 and includes a first or housing end 160A and a second or telescopic end 160B extendable and retractable from housing end 160A. Particularly, the telescopic end 160B of each lower linear actuator 160 is coupled to a lower surface of the support plate 122 of mounting assembly 102 while the housing end 160A of each lower linear actuator 160 is coupled to the upper end 142A of actuator housing 142. In response to the extension of the telescopic end 160B of a first of the lower linear actuators 160 and the corresponding retraction of the telescopic end 160B of a second of the lower linear actuators 160, rotary actuator assembly 140 (and coupler assembly 180 coupled thereto) is rotated in a first rotational direction about a second lateral or tilt axis 150 that extends through pivotal connector 146. Conversely, in response to the extension of the telescopic end 160B of the second of the lower linear actuators 160 and the corresponding retraction of the telescopic end 160B of the first of the lower linear actuators 160, rotary actuator assembly 140 is rotated about second lateral axis 150 in a second rotational direction opposite the first rotational direction. In this embodiment, upper linear actuators 130 and lower linear actuators 160 each comprise hydraulic cylinders controllable from the cab 20 or other control device of reach stacker 10; however, in other embodiments, linear actuators 130, 160 may comprise other actuators, such as pneumatic or electrically powered actuators. In some embodiments, upper linear actuators 130 comprise extension actuators 130, and lower linear actuators 160 comprise tilting actuators 160.

In this embodiment, second lateral axis 150 is disposed perpendicular to both first lateral axis 45 and central axis 105 of lifting unit 100. Particularly, first lateral axis 45 extends between the lateral ends 103A, 103B of lifting unit 100 while second lateral axis 150 extends between forward end 101A and rearward end 101B of lifting unit 100. Further, central axis 105 of lifting unit 100 comprises a vertical axis that may be disposed perpendicular surface 5 or may intersect surface 5 at an angle. Given that pivotal connector 146 is positioned between the mounting plate 126 of mounting assembly 102 and the support frame 144 of rotary actuator assembly 140, actuator housing 142 and the coupler assembly 180 of lifting unit 100 coupled therewith are permitted to rotate about the second lateral axis 150, while the mounting assembly 102 of lifting unit 100 is restricted from rotating about second lateral axis 150 due to the coupling between mounting assembly 102 and telescopic arm 34 of lifting boom 30 via shaft 40.

The coupler assembly 180 of lifting unit 100 is configured to releasably couple with containers, including intermodal cargo containers, such that the container may be positioned by lifting unit 100 and handled by reach stacker 10. In some embodiments, coupler assembly 180 can comprise a laterally fixed frame. In some embodiment, coupler assembly 180 comprises a laterally extending expandable frame 182 and a pair of releasable connectors 184. Expandable frame 182 has a first lateral end 182A and a second lateral end 182B opposite first lateral end 182A. Releasable connectors 184 of coupler assembly 180 are mounted to the lateral ends 182A, 182B of expandable frame 182. In this embodiment, releasable connectors 184 comprise twist lock connectors configured to attach with brackets of an intermodal container; however, in other embodiments, releasable connectors 184 may comprise other types of connectors configured for releasably coupling with containers or other loads to be handled by reach stacker 10. In this embodiment, expandable frame 182 includes at least one hydraulic motor and gear assembly and/or linear actuator for adjusting the distance between lateral ends 182A, 182B of expandable frame 182 thereby adjusting the distance between releasable connectors 184 such that coupler assembly 180 may releasably couple with differently sized containers.

Figure 4:
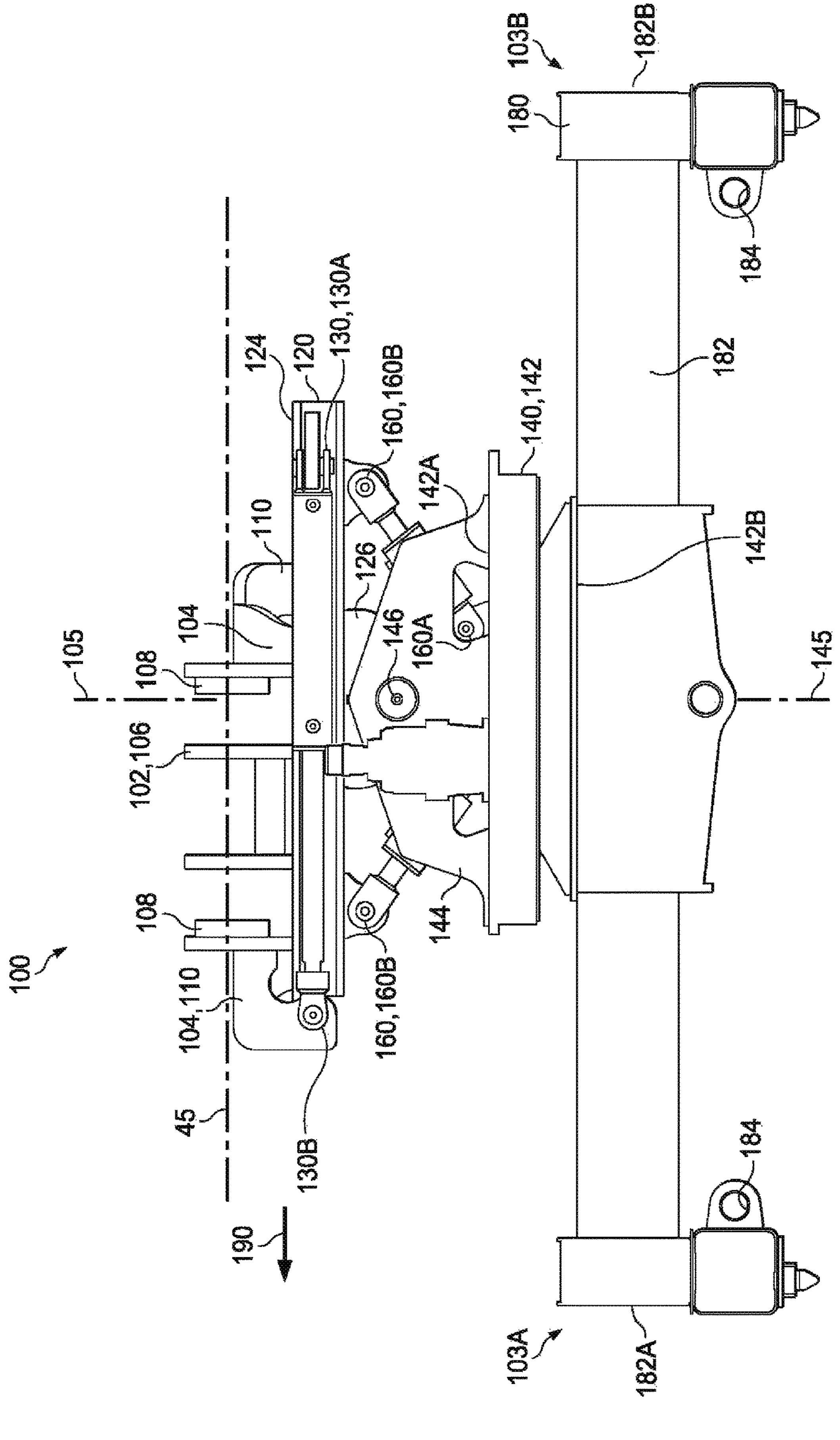
FIG. 4 is a rear view of the lifting unit of FIG. 2 in the first laterally extended position.

Referring generally to FIGS. 1-13, exemplary positions of lifting unit 100 is shown in FIGS. 4-13. Particularly, FIG. 4 illustrates lifting unit 100 in a first laterally extended position (indicated by arrow 190 shown in FIG. 4) where, via extension of the first of the upper linear actuators 130 and a retraction of a second of the upper linear actuators 130, travelling frame 120, rotary actuator assembly 140, and coupler assembly 180 are each extended laterally relative upper mount 104 in the direction of second lateral end 103B. In the first laterally extended position 190 of lifting unit 100, the pivotal connector 106 (coupled with telescopic arm 34 of lifting boom 30 when lifting unit 100 is attached to reach stacker 10) is laterally offset from the central axis 105 of lifting unit 100, located laterally between central axis 105 and the first lateral end 103A of lifting unit 100.

Figure 5:
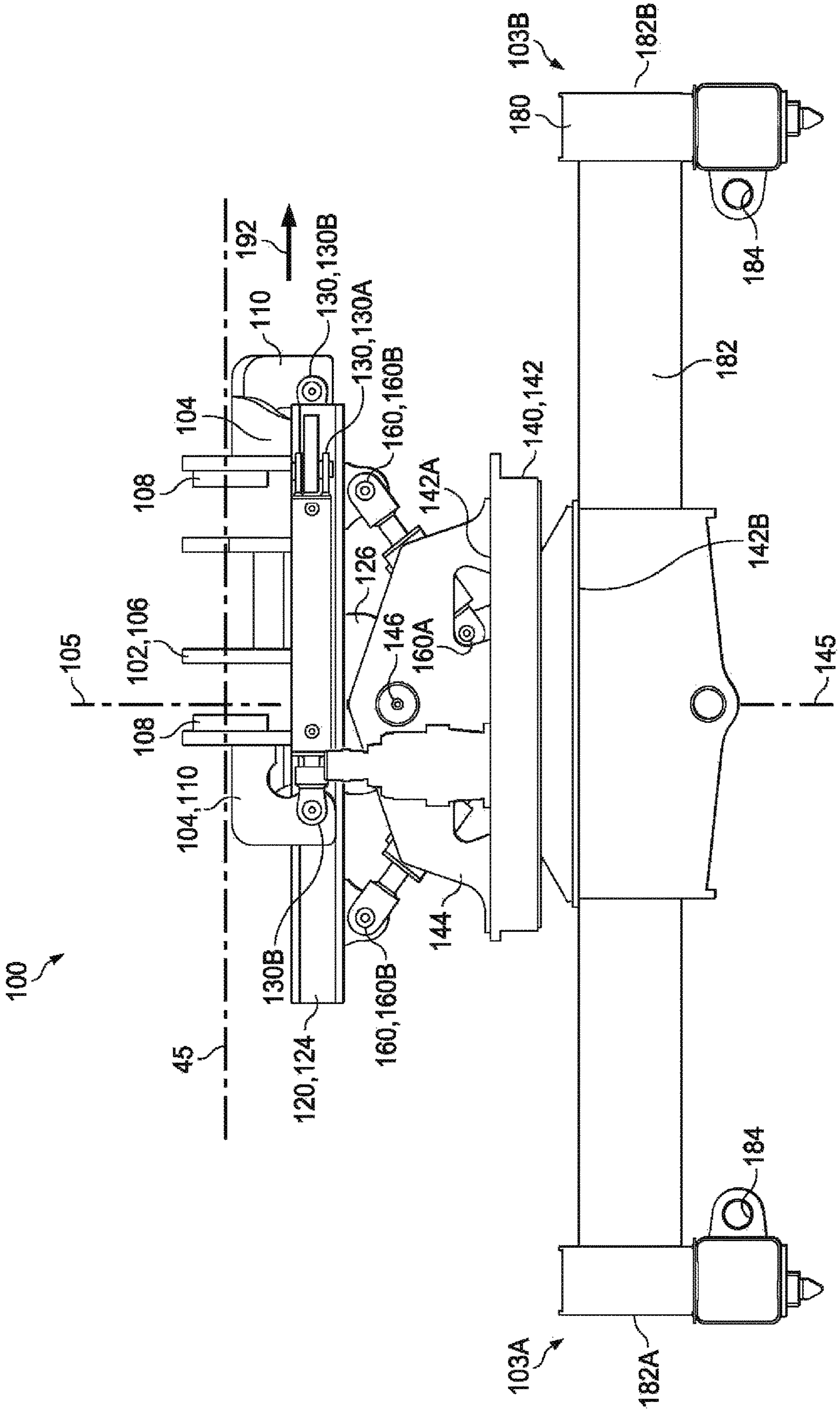
FIG. 5 is a rear view of the lifting unit of FIG. 2 in a second laterally extended position.
Figure 11:
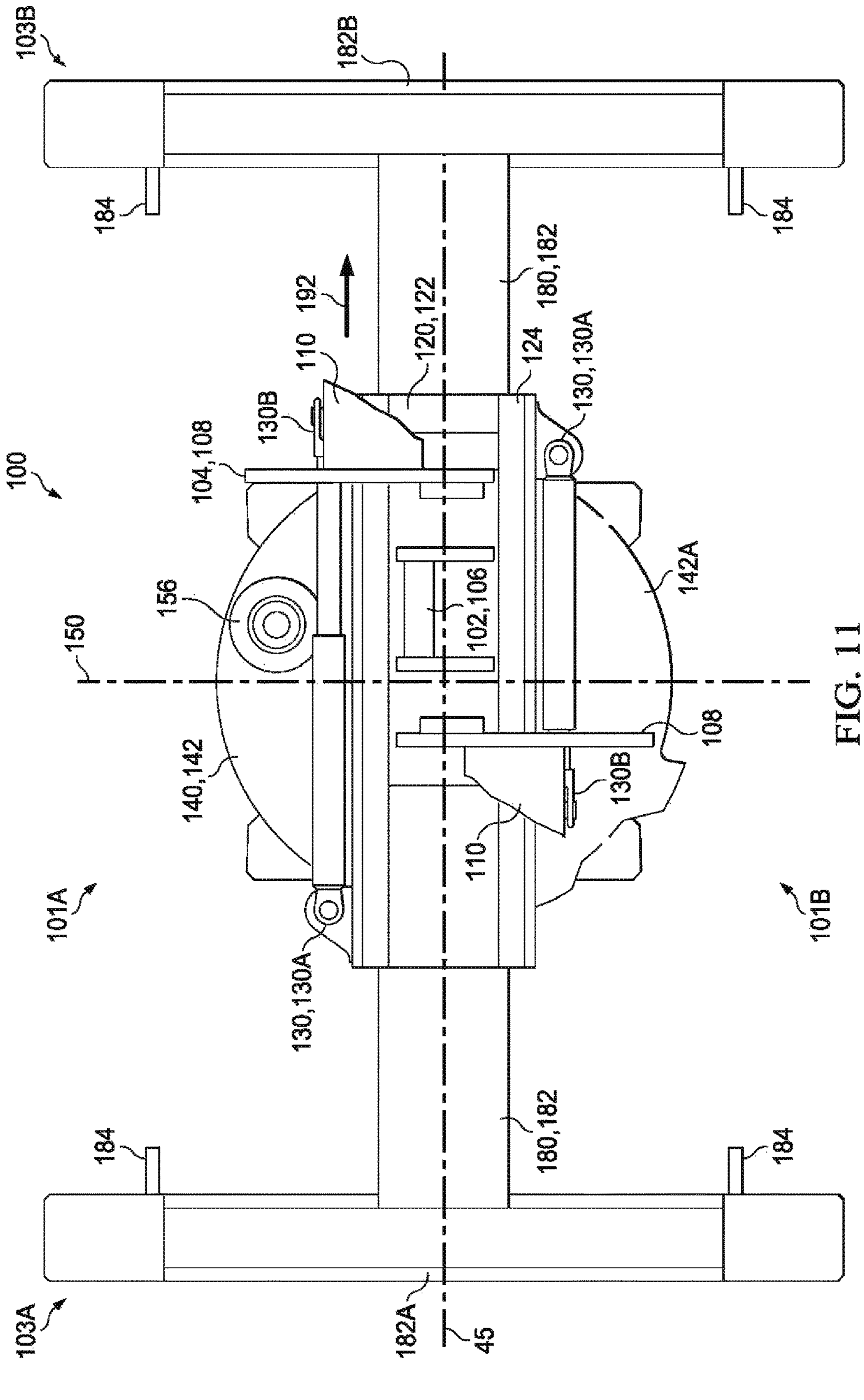
FIG. 11 is a top view of the lifting unit of FIG. 2 in the second laterally extended position.

Conversely, FIGS. 5 and 11 illustrate lifting unit 100 in a second laterally extended position (indicated by arrow 192 shown in FIGS. 5 and 11) where, via retraction of the first of the upper linear actuators 130 and extension of the second of the upper linear actuators 130, travelling frame 120, rotary actuator assembly 140, and coupler assembly 180 are each extended laterally relative upper mount 104 in the direction of first lateral end 103A. In the second laterally extended position 192 of lifting unit 100, the pivotal connector 106 is laterally offset from the central axis 105 of lifting unit 100, located laterally between central axis 105 and the second lateral end 103B of lifting unit 100. Thus, when actuated into the first laterally extended position 190, travelling frame 120, rotary actuator assembly 140, and coupler assembly 180 are each displaced in a first lateral direction relative upper mount 104. Additionally, when actuated into the second laterally extended position 192, travelling frame 120, rotary actuator assembly 140, and coupler assembly 180 are each displaced in a second lateral direction opposite the first lateral direction, where the first and second lateral directions extend along an axis parallel with the first lateral axis 45. Moreover, upper linear actuators 130 may dispose travelling frame 120, rotary actuator assembly 140, and coupler assembly 180 in various laterally extended positions not shown in FIGS. 4, 5, and 11.

Figure 6:
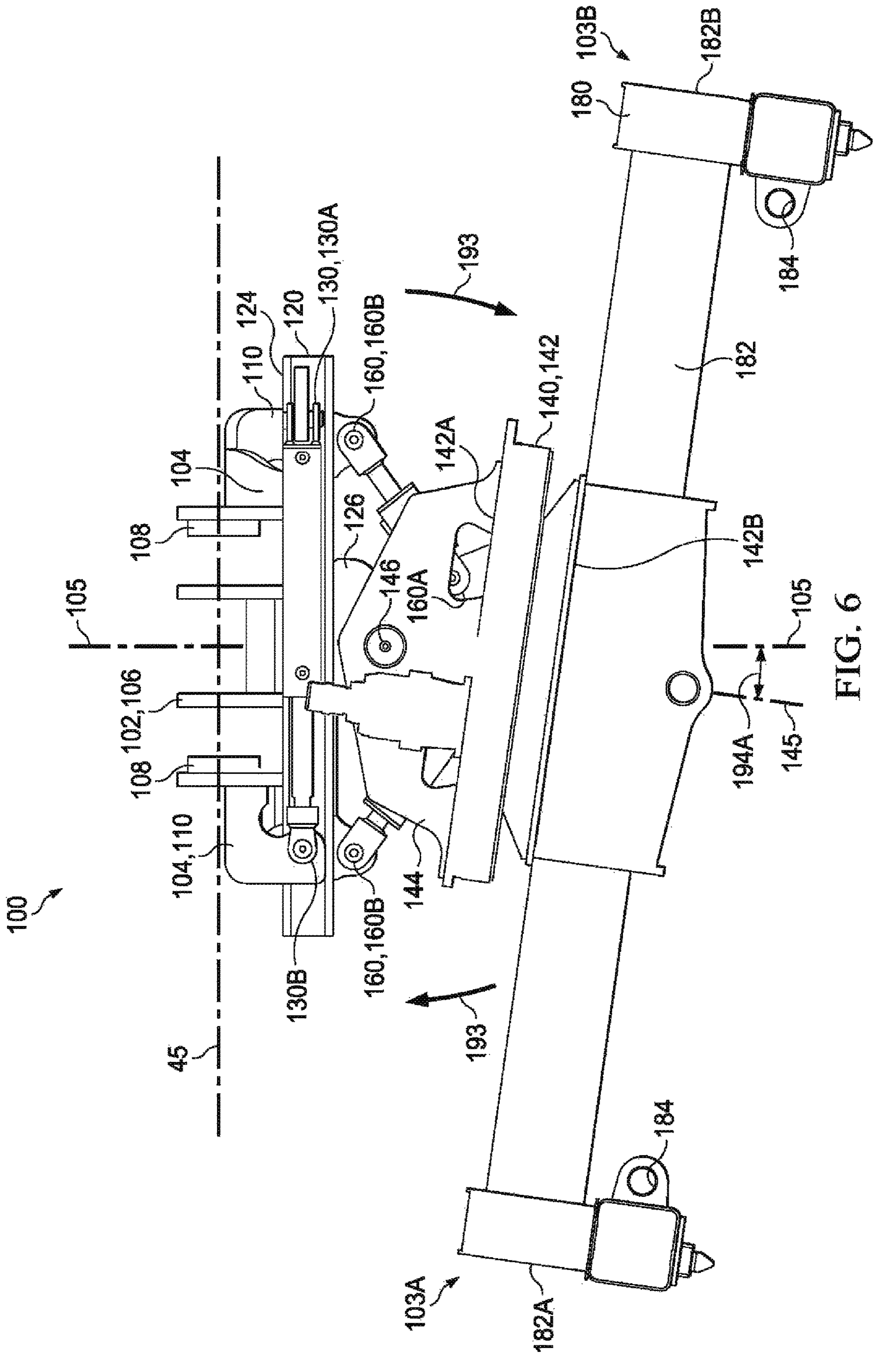
FIG. 6 is a rear view of the lifting unit of FIG. 2 in a first tilted position.

In addition to being laterally extendable as shown in FIGS. 4, 5, and 11, the rotary actuator assembly 140 and coupler assembly 180 of lifting unit 100 are also tiltable about the second lateral axis 150. Particularly, FIG. 6 illustrates lifting unit 100 in a first tilted position (indicated by arrow 193 shown in FIG. 6) where, via retraction of a first of the lower linear actuators 160 and extension of a second of the lower linear actuators 160, rotary actuator assembly 140, and coupler assembly 180 are each rotated or tilted relative mounting assembly 102 in a first rotational direction (clockwise in the embodiment shown in FIG. 6) about the second lateral axis 150. In the first tilted position 193 of lifting unit 100, a non-zero first tilt angle 194A is formed between the central axis of the mounting assembly 102 (disposed coaxial with central axis 105) and the central axis 145 of rotary actuator assembly 140.

Figure 7:
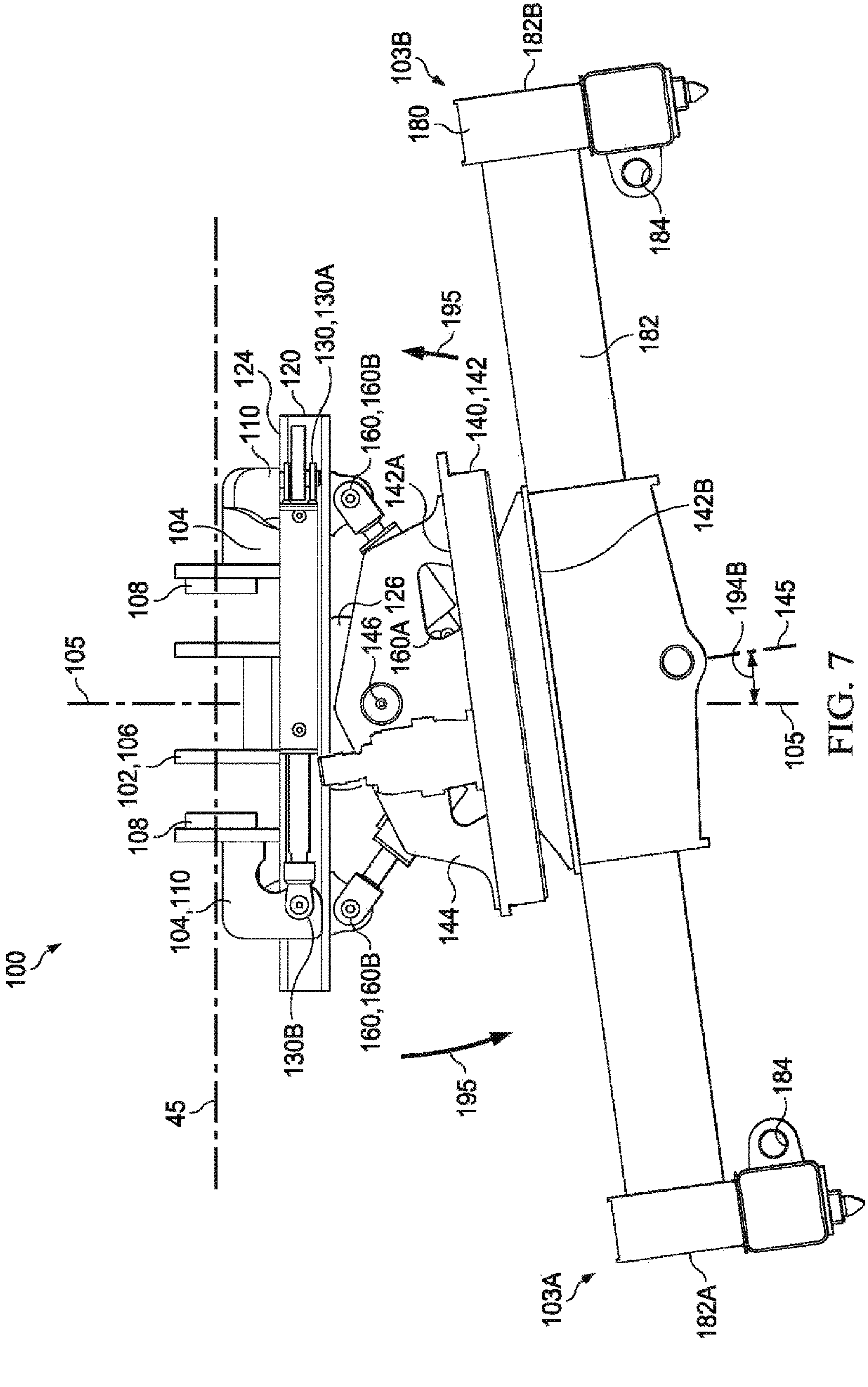
FIG. 7 is a rear view of the lifting unit of FIG. 2 in a second tilted position.

Conversely, FIG. 7 illustrates lifting unit 100 in a second tilted position (indicated by arrow 195 shown in FIG. 7) where, via extension of the first of the lower linear actuators 160 and retraction of the second of the lower linear actuators 160, rotary actuator assembly 140 and coupler assembly 180 are each rotated or tilted relative mounting assembly 102 in a second rotational direction (counterclockwise in the embodiment shown in FIG. 7) about the second lateral axis 150 that is opposite the first rotational direction. In the second tilted position 195 of lifting unit 100, a non-zero second tilt angle 194B is formed between the central axis of the mounting assembly 102 and the central axis 145 of rotary actuator assembly 140, which is different from the first tilt angle 194A shown in FIG. 6. Moreover, lower linear actuators 160 may dispose rotary actuator assembly 140 and coupler assembly 180 in various angular positions relative to the second lateral axis 150. In some embodiments, lower linear actuators 160 provide an angular range of motion to rotary actuator assembly 140 and coupler assembly 180 of approximately 10°-15° about second lateral axis 150; however, in other embodiments, the range of motion about second lateral axis 150 provided by lower linear actuators 160 may vary.

In addition to being laterally extendable as shown in FIGS. 4, 5, and 11, and being tiltable about second lateral axis 150 as shown in FIGS. 6 and 7, the coupler assembly

Figure 8:
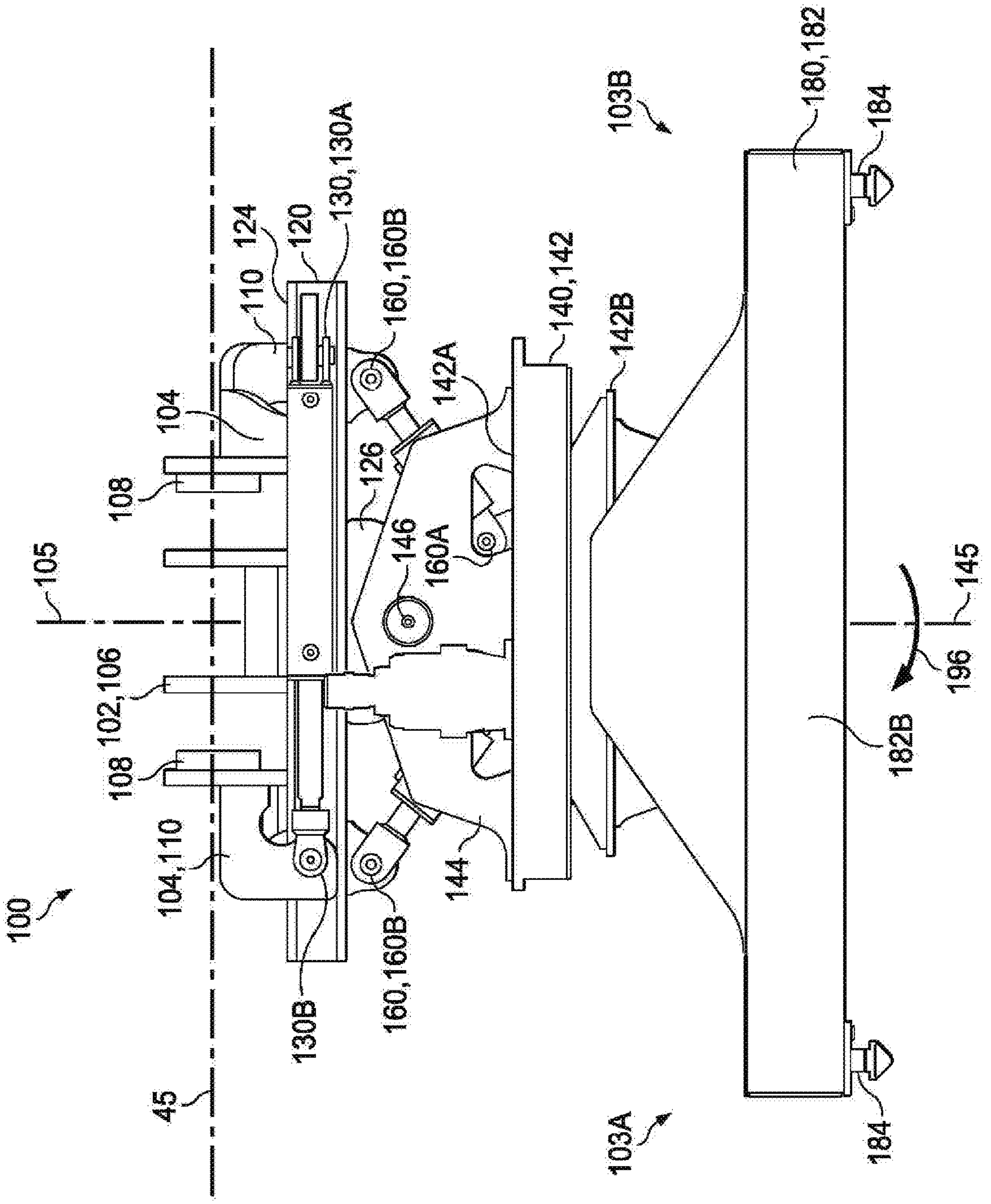
FIG. 8 is a rear view of the lifting unit of FIG. 2 in a rotated position.

180 of lifting unit 100 is also rotatable about the central axis 145 of rotary actuator assembly 140. Particularly, FIG. 8 illustrates lifting unit 100 in a rotated position (indicated by arrow 196 shown in FIG. 8) where, via actuation of rotary actuator 156, coupler assembly 180 is rotated in a first rotational direction (clockwise in the embodiment shown in FIG. 8) about the central axis 145 of rotary actuator assembly 140. Rotary actuator 156 is also configured to rotate coupler assembly 180 about central axis 145 in a second rotational direction opposite the first rotational direction.

In the rotated position 196 of lifting unit 100, the expandable frame 182 is no longer positioned such that a longitudinal or central axis of expandable frame 182 is disposed parallel with, or at least in the same plane as, the first lateral axis 45. Instead, in the rotated position 196, the central axis of expandable frame 182 is disposed parallel with, or at least in the same plane as, the second lateral axis 150. In other words, in the rotated position 196 of lifting unit 100, expandable frame 182 is rotated 90° about central axis 145 relative to the position of expandable frame 182 shown in FIGS. 2-7 and 11. Moreover, rotary actuator 156 may dispose coupler assembly 180 in various angular positions relative to the central axis 145 of rotary actuator assembly 140. In some embodiments, rotary actuator 156 provides an angular range of motion to coupler assembly 180 of approximately 360° about second central axis 145; however, in other embodiments, the range of motion about central axis 145 provided by rotary actuator 156 may vary.

As shown particularly in FIGS. 9, 10, 12, and 13, actuators 130, 156, and 160 may be operated to provide varying positions to lifting unit 100 and particular components thereof. By positioning actuators 130, 156, and 160 in the arrangement shown in FIGS. 2-13, a greater amount of freedom is provided to the driver located in cab 20 of reach stacker 10 in manipulating and positioning equipment coupled to the coupler assembly 180 of lifting unit 100. Moreover, the movement of the equipment coupled to coupler assembly 180 in response to the operation of actuators 130, 156, and 160 of lifting unit 100 is made more intuitive and predictable for the driver located in cab 20 by the arrangement of actuators 130, 156, and 160 shown in FIGS. 2-13.

Figure 9:
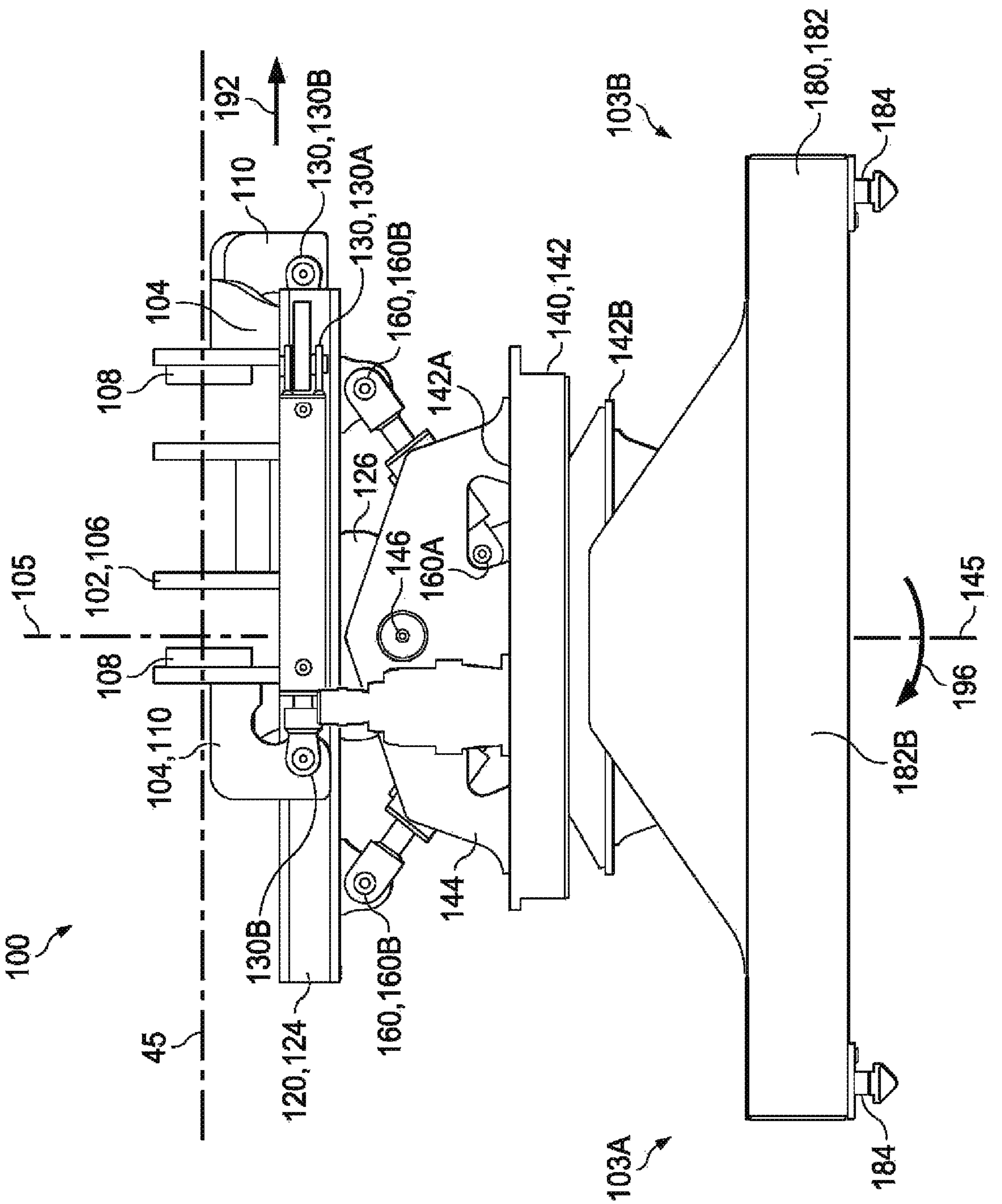
FIG. 9 is a rear view of the lifting unit of FIG. 2 in the rotated and second laterally extended positions.
Figure 12:
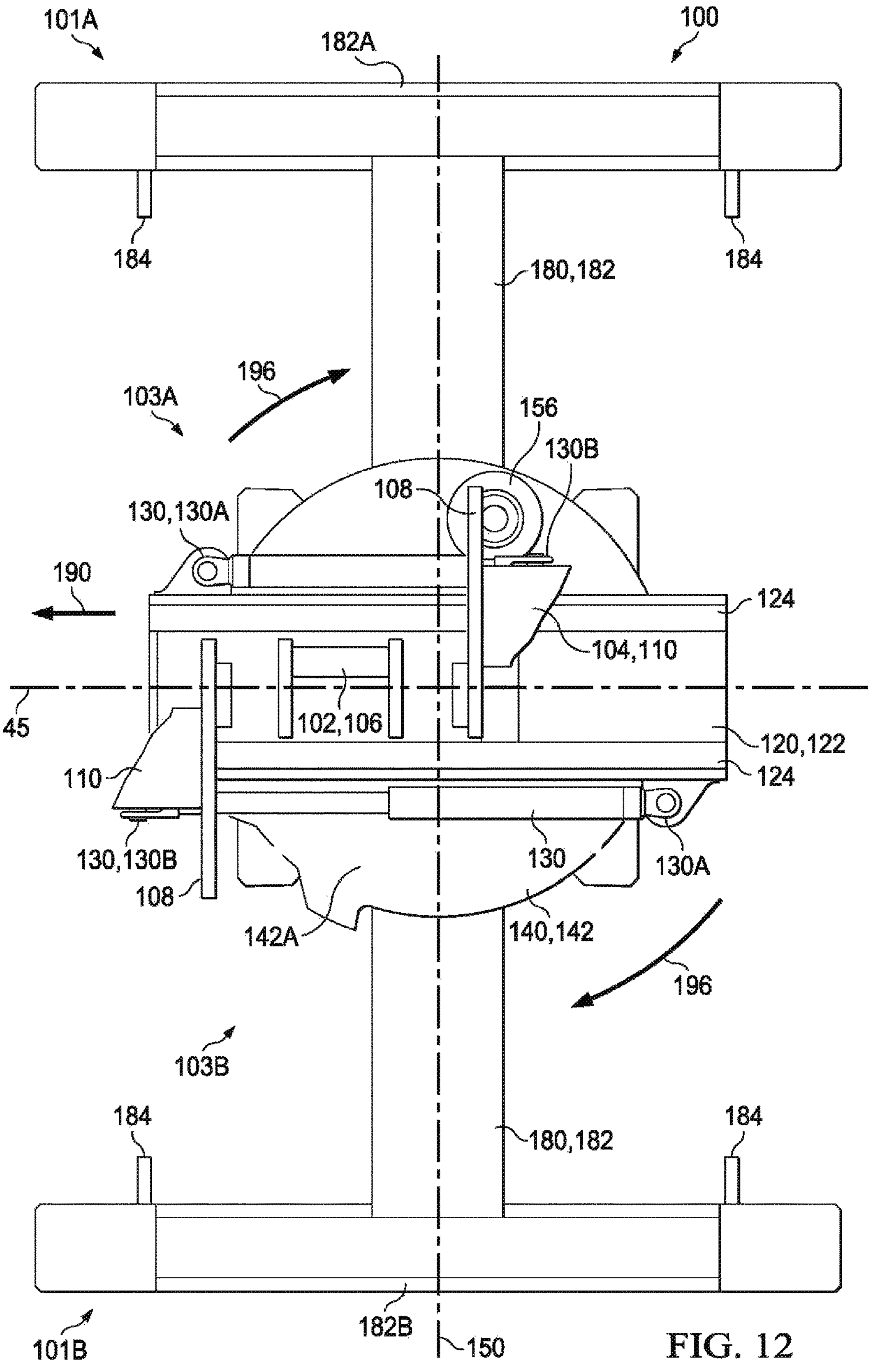
FIG. 12 is a top view of the lifting unit of FIG. 2 in the rotated and first laterally extended positions.
Figure 13:
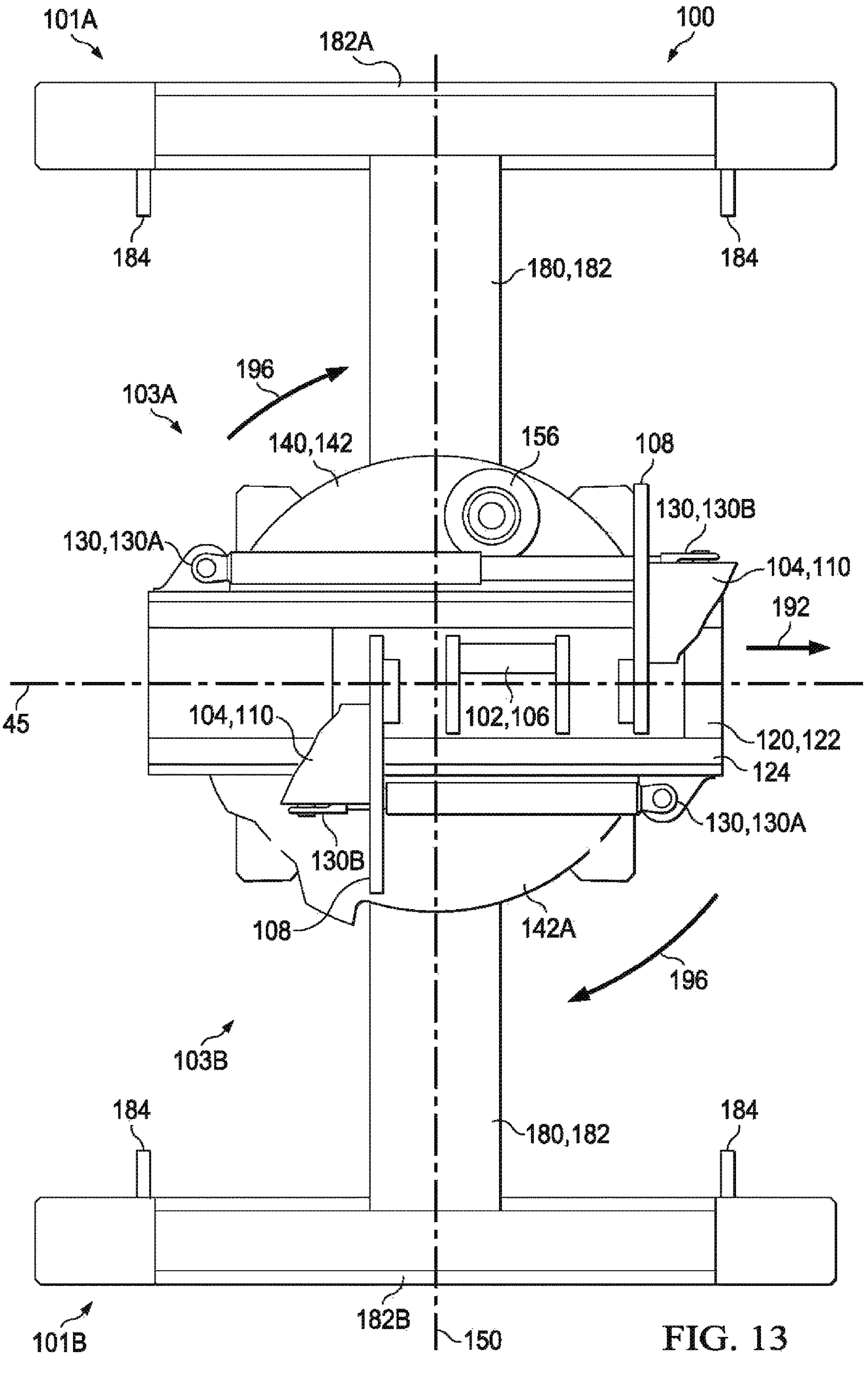
FIG. 13 is a top view of the lifting unit of FIG. 2 in the rotated and second laterally extended positions.

For instance, FIG. 12 illustrates lifting unit 100 in both the first laterally extended position 190 and the rotated position 196. Additionally, FIGS. 9 and 13 illustrate lifting unit 100 in both the second laterally extended position 192 and the rotated position 196. As shown in FIGS. 9, 12, and 13, given that rotary actuator assembly 140 couples directly with coupler assembly 180 (mounting assembly 102 being coupled between rotary actuator assembly 140 and the telescopic arm 34 of lifting boom 30) the angular position of mounting assembly 102 and actuator housing 142 is unaffected by the rotation of coupler assembly 180 about the central axis 145 of rotary actuator assembly 140. Thus, the locations of axes 45, 105, 145, and 150 remain unchanged by the rotation of coupler assembly 180. Given that the locations of the axes 45, 105, 145, and 150 remain unchanged by the rotation of coupler assembly 180, the driver of the reach stacker 10 does not need to correctly anticipate how the rotation of coupler assembly 180 will affect the movement of the equipment coupled with coupler assembly 180 when the driver operates upper linear actuators 130 and/or lower linear actuators 160, where an error in anticipating the effect of rotating coupler assembly 180 may result in improperly positioning the equipment. Instead, the movement of the equipment coupled with coupler assembly 180 in response to the operation of linear actuators 130, and/or 160 is unchanged by the rotation of the coupler assembly 180, providing for more intuitive control for the driver over lifting unit 100.

Figure 10:
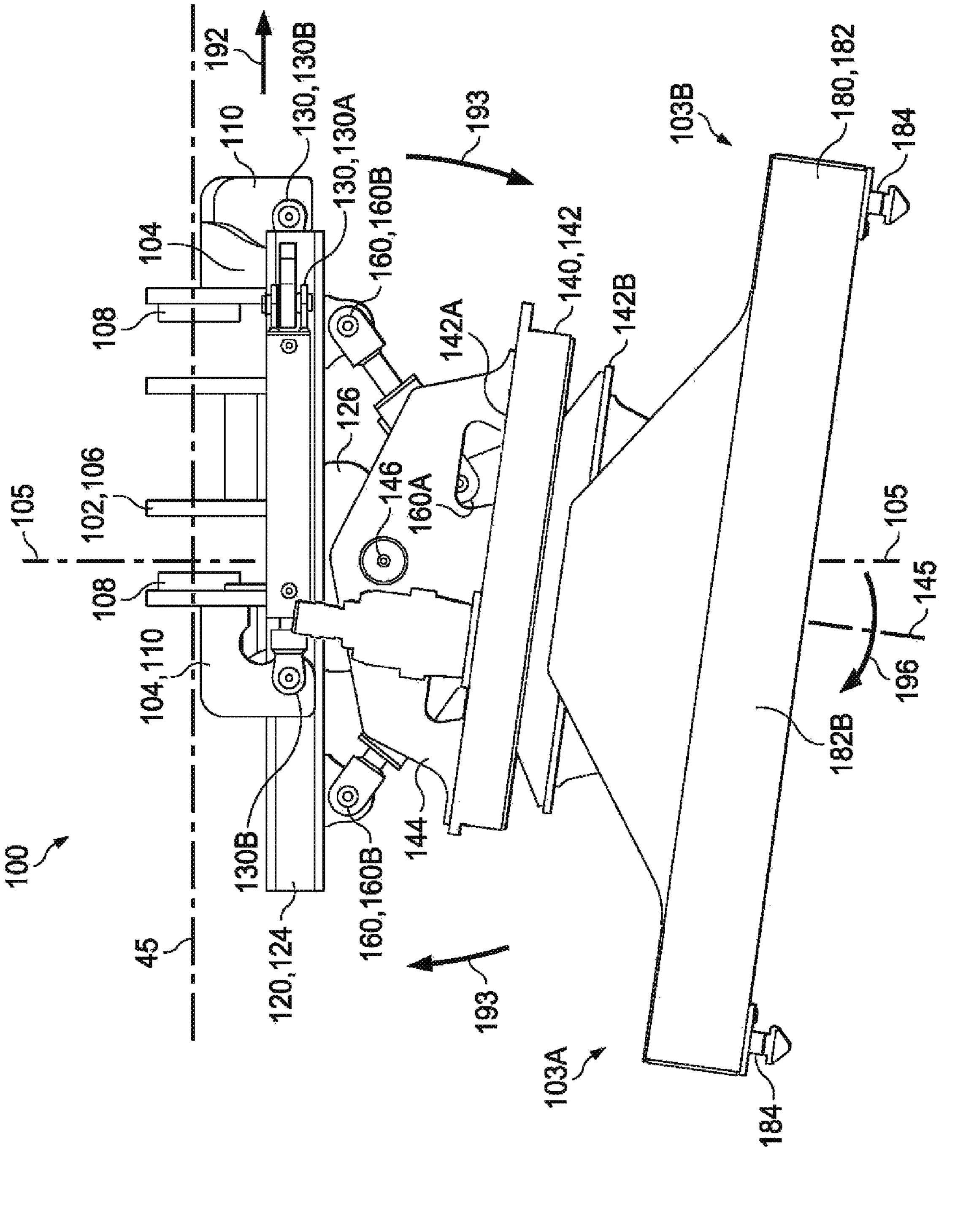
FIG. 10 is a rear view of the lifting unit of FIG. 2 in the rotated, second laterally extended, and first tilted positions.

Further, FIG. 10 illustrates lifting unit 100 in the second extended position 192, first tilted position 193, and rotated position 196. Given that lower linear actuators 160 are coupled between travelling frame 120 and actuator housing 142, the rotation of rotary actuator assembly 140 and coupler assembly 180 about the second lateral axis 150 does not affect the position of mounting assembly 102 or the locations of axes 45, 105, and 150. Instead, only central axis 145 of rotary actuator assembly 140 is displaced in response to the operation of lower linear actuators 160. Given that the locations of the axes 45, 105, and 150 remain unchanged by the rotation of coupler assembly 180, the driver of the reach stacker 10 also does not need to correctly anticipate how the tilting of coupler assembly 180 about second lateral axis 150 will affect the movement of the equipment coupled with coupler assembly 180 when the driver operates upper linear actuators 130, where an error in anticipating the effect of tilting coupler assembly 180 may result in improperly positioning the equipment. Instead, the movement of the equipment coupled with coupler assembly 180 in response to the operation of upper linear actuators 130 is unaffected by the tilting of coupler assembly 180, further providing for more intuitive control for the driver over lifting unit 100.

The reach stacker herein can be used to transport equipment from one location to another. In use, the reach stacker would first be positioned to allow the lifting unit to be aligned with any equipment such as a cargo container to allow the coupler assembly to couple to the equipment. Once coupled, the boom can be raised to provide clearance for the equipment from the ground as well as other structures or equipment. The entire vehicle can then be driven or repositioned as needed to move to the destination location. At the destination, the vehicle can be positioned close to where the equipment is needed to be placed. Once in position, a number of positioning adjustments can be made to position the equipment for placement at the destination. These can include extending or retracting the boom to align the equipment over the final position. The equipment can be laterally moved to laterally align the equipment with the final position, and the equipment can be rotated as needed with the rotary actuator assembly to rotationally position the equipment in the proper orientation. Further, the equipment can be tilted as needed to adjust for potential variances between the tilt of the vehicle chassis and a tilt of the placement location. Each of these adjustments can be made independently and maintained along constant axes relative to the operator of the vehicle.

In some embodiments, the configuration of the vehicle and lifting unit as described herein may allow for equipment coupled to a lifting unit to be rotated from a starting position and laterally shifted. The lateral shifting can be relative to the operator of the vehicle and the axis of the lateral shifting may remain constant regardless of the rotational position of the equipment. For example, the equipment can be shifted laterally in a starting position along an axis perpendicular to the main axis of the vehicle in response to a control input. Upon a rotation of the equipment between zero and one hundred eighty degrees (e.g., more than zero and less than one hundred eighty degrees), the equipment can still be shifted laterally along the same axis perpendicular to the main axis of the vehicle, where the lateral shift can be the same for the same control input. Further, the equipment can similarly be tilted in a manner that is independent of the relative rotation of the equipment.

Thus, the vehicle and lifting unit described herein allow for equipment coupled to the lifting unit to be shifted in any direction using one or more control movements. The shifting in any one direction can be independent of the extent of movement in other directions. This allows for control of the equipment from the position and perspective of the operator to provide more consistent and easier control of equipment transported with the vehicle and lifting unit.

Having described the systems, vehicles, units, and methods herein, various aspects can include, but are not limited to:

In a first embodiment, a lifting unit for a vehicle comprises: a mounting assembly configured to pivotally couple to a lifting boom of the vehicle, wherein the mounting assembly comprises a mount, a travelling frame coupled to the mount, and an extension actuator configured to displace the travelling frame along an extension axis relative to the mount; a coupler assembly configured to releasably couple with equipment positionable by the lifting unit; and a rotary actuator assembly coupled between the mounting assembly and the coupler assembly, wherein the rotary actuator assembly is configured to rotate the coupler assembly about a rotational axis.

A second embodiment can include the lifting unit of the first embodiment, wherein the travelling frame of the mounting assembly comprises a support plate and a rail coupled to a first end of the extension actuator, and the mount of the mounting assembly comprises a first pivotal connector and an arm coupled to a second end of the extension actuator, and wherein the arm of the mount is slidable along the rail of the travelling frame.

A third embodiment can include the lifting unit of the second embodiment, further comprising a second pivotal connector coupled between the rotary actuator assembly and the mounting assembly, wherein the second pivotal connector permits relative rotation between the rotary actuator assembly and the mounting assembly about a tilt axis.

A fourth embodiment can include the lifting unit of the third embodiment, wherein the first pivotal connector is configured to permit the lifting unit to rotate about a pivot axis relative to the lifting boom when the mounting assembly is coupled to the lifting boom, and wherein the pivot axis is disposed perpendicular to the tilt axis.

A fifth embodiment can include the lifting unit of the fourth embodiment, further comprising a tilting actuator coupled between the support plate of the mounting assembly and the rotary actuator assembly, wherein the tilting actuator is configured to rotate the coupler assembly about a tilt axis.

A sixth embodiment can include the lifting unit of the fifth embodiment, wherein the tilt axis is disposed perpendicular to both the pivot axis and the rotational axis.

In a seventh embodiment, a lifting unit for a vehicle comprises: a mounting assembly configured to pivotally couple to a lifting boom of the vehicle, wherein the mounting assembly comprises a mount; a coupler assembly configured to releasably couple with equipment positionable by the lifting unit; a rotary actuator assembly coupled between the mounting assembly and the coupler assembly; and a tilting actuator coupled between the mounting assembly and the rotary actuator assembly; wherein the rotary actuator assembly is configured to rotate the coupler assembly about a rotational axis and the tilting actuator is configured to rotate the coupler assembly about a tilt axis.

An eighth embodiment can include the lifting unit of the seventh embodiment, wherein the mounting assembly comprises the mount, a travelling frame, and an extension actuator configured to displace the travelling frame along an extension axis relative to the mount.

A ninth embodiment can include the lifting unit any one of the seventh or eighth embodiment, wherein the tilting actuator is configured to alter an angle formed between the rotational axis and a central axis of the lifting unit.

A tenth embodiment can include the lifting unit of any one of the seventh to ninth embodiments, wherein the rotary actuator assembly comprises an actuator housing and a rotary actuator disposed at least partially within the actuator housing.

An eleventh embodiment can include the lifting unit of the tenth embodiment, wherein the actuator housing couples to a mounting plate of the mounting assembly with a pivotal connector, and the rotary actuator couples to the coupler assembly.

A twelfth embodiment can include the lifting unit of any one of the seventh to eleventh embodiments, wherein the coupler assembly comprises an expandable frame and a pair of releasable connectors, and wherein the expandable frame is configured to adjust a distance extending between the pair of releasable connectors.

A thirteenth embodiment can include the lifting unit of any one of the seventh to twelfth embodiments, wherein the mounting assembly comprises a mount, a travelling frame coupled to the mount, and an extension actuator configured to displace the travelling frame along an extension axis relative to the mount.

A fourteenth embodiment can include the lifting unit of the thirteenth embodiment, wherein the travelling frame of the mounting assembly comprises a support plate and a rail coupled to a first end of the extension actuator, and the mount of the mounting assembly comprises a pivotal connector and an arm coupled to a second end of the extension actuator, and wherein the arm of the mount is slidable along the rail of the travelling frame.

A fifteenth embodiment can include the lifting unit of the fourteenth embodiment, wherein the extension axis is disposed perpendicular to the rotational axis.

In a sixteenth embodiment, a vehicle for handling equipment comprises: a chassis comprising a rotatable axle; a lifting boom pivotally coupled to the chassis; and a lifting unit coupled to an end of the lifting boom, wherein the lifting unit comprises: a mounting assembly pivotally coupled to the end of the lifting boom of the vehicle; a coupler assembly configured to releasably couple with equipment positionable by the lifting unit; and a rotary actuator assembly coupled between the mounting assembly and the coupler assembly, wherein the rotary actuator assembly is configured to rotate the coupler assembly about a rotational axis.

A seventeenth embodiment can include the vehicle of the sixteenth embodiment, wherein the mounting assembly of the lifting unit comprises: a mount pivotally coupled to the end of the lifting boom; a travelling frame coupled to the mount; and an extension actuator configured to displace the coupler assembly along an extension axis relative to the mount.

An eighteenth embodiment can include the vehicle of the seventeenth embodiment, wherein the travelling frame of the mounting assembly comprises a support plate and a rail coupled to a first end of the extension actuator, and the mount of the mounting assembly comprises an arm coupled to a second end of the extension actuator, and wherein the arm of the mount is slidable along the rail of the travelling frame.

A nineteenth embodiment can include the vehicle of any one of the sixteenth to eighteenth embodiments, wherein the lifting unit further comprises a tilting actuator coupled between the mounting assembly and the rotary actuator assembly, wherein the tilting actuator is configured to rotate the coupler assembly about a tilt axis A twentieth embodiment can include the vehicle of the nineteenth embodiment, wherein the lifting unit further comprises a pivot actuator coupled between the lifting boom and the mount of the mounting assembly, wherein the pivot actuator is configured to rotate the lifting unit about a pivot axis.

A twenty first embodiment can include the vehicle of the twentieth embodiment, wherein the tilt axis is disposed perpendicular to both the pivot axis and the rotational axis.

While disclosed embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A lifting unit for a vehicle, comprising:

a mounting assembly configured to pivotally couple to a lifting boom of the vehicle, wherein the mounting assembly comprises a mount, a travelling frame coupled to the mount, and an extension actuator configured to displace the travelling frame along an extension axis relative to the mount, and wherein the mount of the mounting assembly comprises a first pivotal connector and an arm coupled to a second end of the extension actuator, and wherein the arm of the mount is slidable along the rail of the traveling frame;

a coupler assembly configured to releasably couple with an equipment positionable by the lifting unit; and a rotary actuator assembly coupled between the mounting assembly and the coupler assembly, wherein the rotary actuator assembly is configured to rotate the coupler assembly about a rotational axis.

2. The lifting unit of claim 1, wherein the travelling frame of the mounting assembly comprises a support plate and a rail coupled to a first end of the extension actuator.

3. The lifting unit of claim 2, further comprising a second pivotal connector coupled between the rotary actuator assembly and the mounting assembly, wherein the second pivotal connector permits relative rotation between the rotary actuator assembly and the mounting assembly about a tilt axis.

4. The lifting unit of claim 3, wherein the first pivotal connector is configured to permit the lifting unit to rotate about a pivot axis relative to the lifting boom when the mounting assembly is coupled to the lifting boom, and wherein the pivot axis is disposed perpendicular to the tilt axis.

5. The lifting unit of claim 4, further comprising a tilting actuator coupled between the support plate of the mounting assembly and the rotary actuator assembly, wherein the tilting actuator is configured to rotate the coupler assembly about a tilt axis.

6. The lifting unit of claim 5, wherein the tilt axis is disposed perpendicular to both the pivot axis and the rotational axis.

7. A lifting unit for a vehicle, comprising:

a mounting assembly configured to pivotally couple to a lifting boom of the vehicle, wherein the mounting assembly comprises a mount, a travelling frame coupled to the mount, and an extension actuator configured to displace the travelling frame along an extension axis relative to the mount;

a coupler assembly configured to releasably couple with an equipment positionable by the lifting unit;

a rotary actuator assembly coupled between the mounting assembly and the coupler assembly; and a tilting actuator coupled between the mounting assembly and the rotary actuator assembly;

wherein the rotary actuator assembly is configured to rotate the coupler assembly about a rotational axis and the tilting actuator is configured to rotate the coupler assembly about a tilt axis, and wherein the mount of the mounting assembly comprises a first pivotal connector and an arm coupled to a second end of the extension actuator, and wherein the arm of the mount is slidable along the rail of the travelling frame.

8. The lifting unit of claim 7, wherein the mounting assembly comprises the mount, a travelling frame, and an extension actuator configured to displace the travelling frame along an extension axis relative to the mount.

9. The lifting unit of claim 7, wherein the tilting actuator is configured to alter an angle formed between the rotational axis and a central axis of the lifting unit.

10. The lifting unit of claim 7, wherein the rotary actuator assembly comprises an actuator housing and a rotary actuator disposed at least partially within the actuator housing.

11. The lifting unit of claim 10, wherein the actuator housing couples to a mounting plate of the mounting assembly with a pivotal connector, and the rotary actuator couples to the coupler assembly.

12. The lifting unit of claim 7, wherein the coupler assembly comprises an expandable frame and a pair of releasable connectors, and wherein the expandable frame is configured to adjust a distance extending between the pair of releasable connectors.

13. The lifting unit of claim 7, wherein the travelling frame of the mounting assembly comprises a support plate and a rail coupled to a first end of the extension actuator.

14. The lifting unit of claim 13, wherein the extension axis is disposed perpendicular to the rotational axis.

15. A vehicle for handling equipment, comprising:

a chassis comprising a rotatable axle;

a lifting boom pivotally coupled to the chassis; and a lifting unit coupled to an end of the lifting boom, wherein the lifting unit comprises:

a mounting assembly pivotally coupled to the end of the lifting boom of the vehicle, wherein the mounting assembly of the lifting unit comprises a mount pivotally coupled to the end of the lifting boom; a travelling frame coupled to the mount; and an extension actuator configured to displace the coupler assembly along an extension axis relative to the mount, and wherein the mount of the mounting assembly comprises a first pivotal connector and an arm coupled to a second end of the extension actuator, and wherein the arm of the mount is slidable along the rail of the travelling frame;

a coupler assembly configured to releasably couple with an equipment positionable by the lifting unit; and a rotary actuator assembly coupled between the mounting assembly and the coupler assembly, wherein the rotary actuator assembly is configured to rotate the coupler assembly about a rotational axis.

16. The vehicle of claim 15, wherein the travelling frame of the mounting assembly comprises a support plate and a rail coupled to a first end of the extension actuator.

17. The vehicle of claim 15, wherein the lifting unit further comprises a tilting actuator coupled between the mounting assembly and the rotary actuator assembly, wherein the tilting actuator is configured to rotate the coupler assembly about a tilt axis.

18. The vehicle of claim 17, wherein the lifting unit further comprises a pivot actuator coupled between the lifting boom and the mount of the mounting assembly, wherein the pivot actuator is configured to rotate the lifting unit about a pivot axis.

19. The vehicle of claim 18, wherein the tilt axis is disposed perpendicular to both the pivot axis and the rotational axis.

* * * * *